United States Patent
Jones et al.

(10) Patent No.: US 12,079,355 B2
(45) Date of Patent: Sep. 3, 2024

(54) PERFORMING REMOTE HIDDEN COMPUTE FUNCTIONS IN ONE OR MORE PROCESSING DEVICES

(71) Applicant: Seagate Technology LLC, Fremont, CA (US)

(72) Inventors: Marc Timothy Jones, Longmont, CO (US); David Jerome Allen, Monument, CO (US); Steven Williams, Longmont, CO (US); Jason Matthew Feist, Minneapolis, MN (US)

(73) Assignee: Seagate Technology, LLC, Fremont, CA (US)

( * ) Notice: Subject to any disclaimer, the term of this patent is extended or adjusted under 35 U.S.C. 154(b) by 252 days.

(21) Appl. No.: 17/846,871

(22) Filed: Jun. 22, 2022

(65) Prior Publication Data
US 2023/0418959 A1    Dec. 28, 2023

(51) Int. Cl.
*G06F 21/62*    (2013.01)
(52) U.S. Cl.
CPC ...... *G06F 21/62* (2013.01); *G06F 2221/2143* (2013.01)
(58) Field of Classification Search
CPC .......................... G06F 21/62; G06F 2221/2143
See application file for complete search history.

(56) References Cited

U.S. PATENT DOCUMENTS

| | | | |
|---|---|---|---|
| 9,431,080 B2 | 8/2016 | Lum | |
| 10,394,746 B2 | 8/2019 | Kachare et al. | |
| 10,999,295 B2 | 5/2021 | Gil et al. | |
| 11,017,127 B2 | 5/2021 | Secatch et al. | |
| 2006/0074850 A1* | 4/2006 | Bouchet | G06F 9/50 |
| 2012/0166576 A1* | 6/2012 | Orsini | H04L 67/1097 709/217 |
| 2020/0111066 A1 | 4/2020 | Anstey et al. | |
| 2020/0117640 A1* | 4/2020 | Liu | G06F 16/178 |
| 2020/0285523 A1 | 9/2020 | Guim Bernat et al. | |
| 2021/0081936 A1 | 3/2021 | Nuzzi | |

* cited by examiner

*Primary Examiner* — Thaddeus J Plecha
(74) *Attorney, Agent, or Firm* — Hall Estill Law Firm (57) ABSTRACT

Apparatus and method for executing hidden computational functions in a distributed data processing environment. In some embodiments, a trust boundary includes a target device such as a storage device, and a source device such as a client device in a computer network. A storage device processor executes a hidden command function (HCF) routine to accumulate HCF output data in a local cache responsive to an HCF command received from the client device over a data interface. The processor further establishes a smaller retention boundary within the trust boundary that includes the storage device and excludes the client device. The HCF output data are stored locally in a non-volatile memory (NVM) of the storage device while not transferring any portion of the HCF output data outside the retention boundary, including to the client device. The HCF routine can update a block-chain ledger or take some other form to provide data security.

20 Claims, 6 Drawing Sheets

PERFORMING REMOTE HIDDEN COMPUTE FUNCTIONS IN ONE OR MORE PROCESSING DEVICES

SUMMARY

Various embodiments of the present disclosure are generally directed to the distributed processing of data in a computer network environment using a hidden compute functionality of a target device.

In some embodiments, a trust boundary includes a target device such as a storage device, and a source device such as a client device in a computer network. A storage device processor executes a hidden command function (HCF) routine to accumulate HCF output data in a local cache responsive to an HCF command received from the client device over a data interface. The processor further establishes a smaller retention boundary within the trust boundary that includes the storage device and excludes the client device. The HCF output data can be stored locally in a non-volatile memory (NVM) of the storage device while not transferring any portion of the HCF output data outside the retention boundary, including to the client device. The HCF routine can update a block-chain ledger or take some other form to provide data security and other benefits.

These and other features which may characterize various embodiments can be understood in view of the following detailed discussion and the accompanying drawings.

DETAILED DESCRIPTION

The present disclosure is generally directed to systems and methods for performing hidden compute functions in a data processing environment.

Data storage devices store and retrieve computerized data in a fast and efficient manner. A data storage device usually includes a top level controller and a main memory store, such as a non-volatile memory (NVM), to store data associated with an client device. The NVM can take any number of forms, including but not limited to rotatable media and solid-state semiconductor memory.

Computer networks are arranged to interconnect various devices to enable data exchange operations. It is common to describe such exchange operations as being carried out between a client device and a data storage device. Examples of computer networks of interest with regard to the present disclosure include public and private cloud storage systems, local area networks, wide area networks, object storage systems, the Internet, cellular networks, satellite constellations, storage clusters, etc. While not required, these and other types of networks can be arranged in accordance with various industry standards in order to specify the interface and operation of the interconnected devices.

One commonly utilized industry standard is referred to as Non-Volatile Memory Express (NVMe), which generally establishes NVMe domains (namespaces) to expedite parallel processing and enhance I/O throughput accesses to the NVM memory in the network. Another standard is referred to as Compute Express Link (CXL) which enhances high speed central processing unit (CPU) to device and CPU to memory data transfers. Both NVMe and CXL are particularly suited to the use of Peripheral Computer Interface Express (PCIe) interfaces, although other types of interfaces can be used.

A current trend in present generation networks is the use of distributed processing techniques whereby data processing operations are carried out across multiple devices, including devices that are distributed over a large geographical area. For example, it can be advantageous for a client device to offload and distribute various computational functions among one or more local data storage devices to carry out mass computing operations and to aggregate the results of these operations to advance a desired result at a higher hierarchical level in the network.

In some cases, it may be desirous to perform distributed processing operations without returning the processing results to the initiating client or to another remote entity. These types of processes are referred to in this disclosure as so-called "hidden" functions, in that the results of the functions are retained locally and not placed on an interface. There are a variety of reasons for using hidden functionality, including but not limited to security, volumetric factors, level loading, etc.

Accordingly, various embodiments of the present disclosure are generally directed to a method and apparatus for enhancing the efficiency and management of these and other types of distributed data processing operations in a network environment by providing hidden functionality capabilities. As explained below, such operations, referred to herein as hidden computational functions (HCFs), are pushed from a higher level client device to a lower level local device. In some cases, the higher level client device may be a host (client) device and the lower level local device may be a data storage device (e.g., an SSD, an HDD, a hybrid data storage device, a storage array, etc.). Access to the results of the functions are maintained locally and not distributed beyond a local boundary associated with the processing devices. This includes a restriction that the results of the HCFs are not returned to the initiating client, or to any other device outside the established boundary.

Any number of different types of computational functions can be pushed by the source device to the target device. In some illustrated embodiments discussed below, a selected source device is interconnected over a suitable interface to one or more target devices in a network environment. The source device may be a client device such as a mass storage controller, a server, a user device, etc., and the target devices may be a data storage device, an array of such devices, other forms of processing devices, etc. The interface may be PCIe based, and the device(s) may operate in accordance with the NVMe and/or CXL standards, although such constraints are merely illustrative and are not necessarily required.

During operation, an HCF command is forwarded from the source device to the target device. The command directs a local controller to carry out an associated HCF. The command may be issued by a controller of the source device and processed by a controller of the target device. When the HCF functionality is realized in firmware/software programming instructions, the HCF routine may be stored locally by the target device or transferred to the target device in conjunction with the command.

The execution of the HCF routine results in the accumulation of output data in a local cache of the target device. The local cache constitutes a memory of the target device and may be arranged as a volatile or non-volatile memory of the target device. The system is memory agnostic in that any number of different types of memory constructions can be used for the respective caches including but not limited to RAM, flash, disc, FeRAM, etc. The respective caches may have the same construction or may have different constructions.

Any number of different types of HCFs can be executed using the principles of the present disclosure. The functions can include operations in which it is not necessary or desirable for the initiating source device to have access to the data stored by and/or accessed by the target device(s). This can enhance security aspects of the system, since the initiating source device is not privy to the underlying data used to generate the final output data, or the HCF results.

Figure 1:
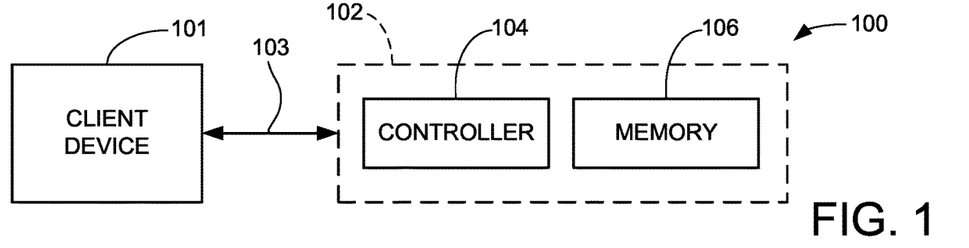
FIG. 1 provides a functional block representation of a system having a client (source) device coupled to a data storage (target) device constructed and operated in accordance with various embodiments.

These and other features and advantages of various embodiments can be understood beginning with a review of FIG. 1 which shows a functional block representation of aspects of a data processing network 100. The network 100 includes a client device 101 coupled to a data storage device 102 using a suitable interface 103. The client device 101 will sometimes be referred to herein as a source device and the data storage device 102 will sometimes be referred to herein as a target device. Other types of source and target devices can be used.

The client device 101 can take any number of desired forms including but not limited to a host device, a server, a RAID controller, a router, a network accessible device such as a tablet, smart phone, laptop, desktop, workstation, gaming system, other forms of user devices, etc. While not limiting, the client device 101 is contemplated as having at least one controller, which may include one or more hardware or programmable processors, as well as memory, interface electronics, software, firmware, etc. As described herein, programmable processors operate responsive to program instructions that are stored in memory and provide input instructions in a selected sequence to carry out various intended operations. Hardware processors utilize hardwired gate logic to perform the required logic operations.

The data storage device 102 can take any number of desired forms including a hard disc drive (HDD), a solid-state drive (SSD), a hybrid drive, an optical drive, a thumb drive, a network appliance, a mass storage device (including a storage enclosure having an array of data storage devices), etc. Regardless of form, the data storage device 102 is configured to store user data provided by the client device 101 and retrieve such data as required to authorized devices across the network, including but not limited to the initiating client device 101 that supplied the stored data.

The data storage device 102 includes a main device controller 104 and a memory 106. The main device controller 104 can be configured as one or more hardware based controllers and/or one or more programmable processors that execute program instructions stored in an associated memory. The memory 106 can include volatile or non-volatile memory storage including flash, RAM, other forms of semiconductor memory, rotatable storage discs, etc. The memory can be arranged as a main store to store user data from the client device as well as various buffers, caches and other memory to store user data and other types of information to support data transfer and processing operations.

The interface 103 provides wired or wireless communication between the respective client and storage devices 101, 102, and may involve local or remote interconnection between such devices in substantially any desired computational environment including local interconnection, a local area network, a wide area network, a private or public cloud computing environment, a server interconnection, the Internet, a satellite constellation, a data cluster, a data center, etc. While PCIe is contemplated as a suitable interface protocol for some or all of the interconnections between the respective devices 101/102, such is not necessarily required.

Figure 2:
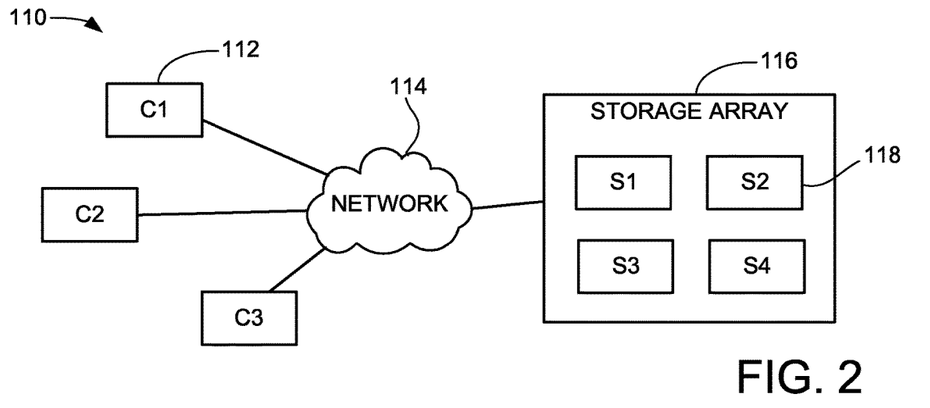
FIG. 2 shows aspects of a computer network having elements such as illustrated in FIG. 1 in accordance with some embodiments.

FIG. 2 depicts aspects of a computer network 110 in accordance with some embodiments of the present disclosure. The network 110 includes a number of client devices 112 denoted as C1-C3, an intervening network 114, and a storage array 116 formed of a number of data storage devices 118 denoted as S1-S4. While not limiting, the client devices 112 can correspond to the client device 101, the storage devices 118 can correspond to the storage device 102, and the network 114 can include one or more interfaces such as 103.

Depending on scale and configuration, the network 114 may include numerous servers, routers, switches and other equipment useful in establishing communication between the respective client devices and the storage array. The storage array 116 may have a corresponding storage controller (not separately shown in FIG. 1) to coordinate storage and retrieval of user data responsive to commands supplied by the client devices. While not required, the network 110 may operate in accordance with the NVMe standard.

Figure 3:
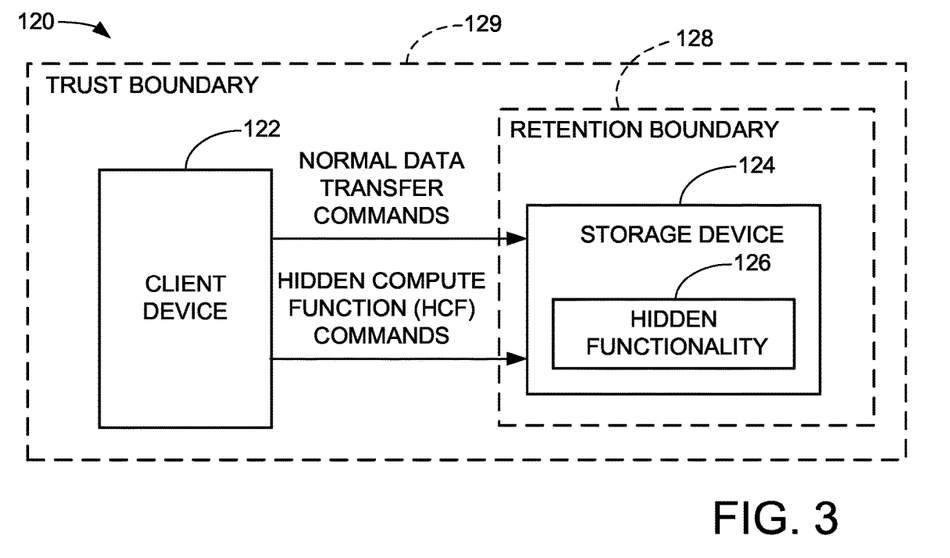
FIG. 3 shows another arrangement of a client device and a storage device as set forth in FIGS. 1-2 in some embodiments.

FIG. 3 shows yet another aspect of a computer network 120 similar to the network 110 in FIG. 2. A client device 122 communicates two types of commands to a corresponding data storage device 124: normal data transfer commands and hidden compute function (HCF) commands.

The normal commands will be understood by the skilled artisan as ordinary types of commands within a given command set based on the configuration of the system. These include and are not limited to read commands, write commands, trim commands, secure erase commands, status commands, etc. As will be recognized, these commands involve the transfer and/or management of data by the storage device on behalf of the client device. For example, a read command may involve the request, via logical addressing, of the recovering of a requested set of readback data from the NVM storage device. A write command may involve the request to store a presented set of writeback data, again identified by suitable logical addressing, for storage in the NVM of the storage device.

The HCF commands, on the other hand, are specially configured commands that are supplied to the storage device 124 in order to carry out hidden functionality by the storage device, as indicated by block 126. As explained below, the hidden functionality enables the storage device, or a group of locally associated storage devices, to perform a data processing operation upon data to generate output data in the form of HCF results that are not returned to the client device. Rather, the processing is carried out, and remains, locally derived and contained.

In some cases, a retention boundary is established, as denoted by broken box 128, in which the HCF results remain and across which the HCF results do not pass. Referring again to FIG. 2, the boundary may include, for example, some or all of the storage devices 118 in the storage array 116. It will be noted that, in order for the client device 122 and the storage device 124 to carry out either normal data transfer command processing or HCF command processing, both of these devices may need to be located within a trust boundary (broken box 129). It follows that the retention boundary may form a smaller subset of the existing trust boundary 129, as depicted in FIG. 3.

However, it is contemplated that in some cases the retention boundary 128 may overlap and extend beyond the trust boundary 129, such as in a situation where another device (such as a second data storage device) not within the initial trust boundary 129 is required to participate in the hidden functionality processing. In such case, suitable inter-device authentication techniques can be carried out among these devices as required. It will be noted that the final retention boundary in which the HCF results remain and are not allowed to pass can be subsequently defined or changed at the conclusion of the HCF processing, or at any suitable subsequent time.

The trust boundary 129 can be generated in any number of ways, including use of authentication routines that include a TSI (trusted security interface) authority, challenge values, data exchanges, and/or any other mechanisms as known in the art to authenticate one device to another. The retention boundary 128 can be predetermined based on existing system requirements (e.g., all of the drives in a JBOD, etc.), or can be selected from existing devices that are already present in the existing trust boundary (e.g., some or all of the other storage devices within the boundary that have already been authenticated to each other, an NVMe controller that has been authenticated, etc.). In some cases, the retention boundary can be selected to remain within a particular class or type of device (e.g., only storage devices, no client devices or servers, no remote devices, no devices that communicate from a selected interface path, etc.).

Figure 4:
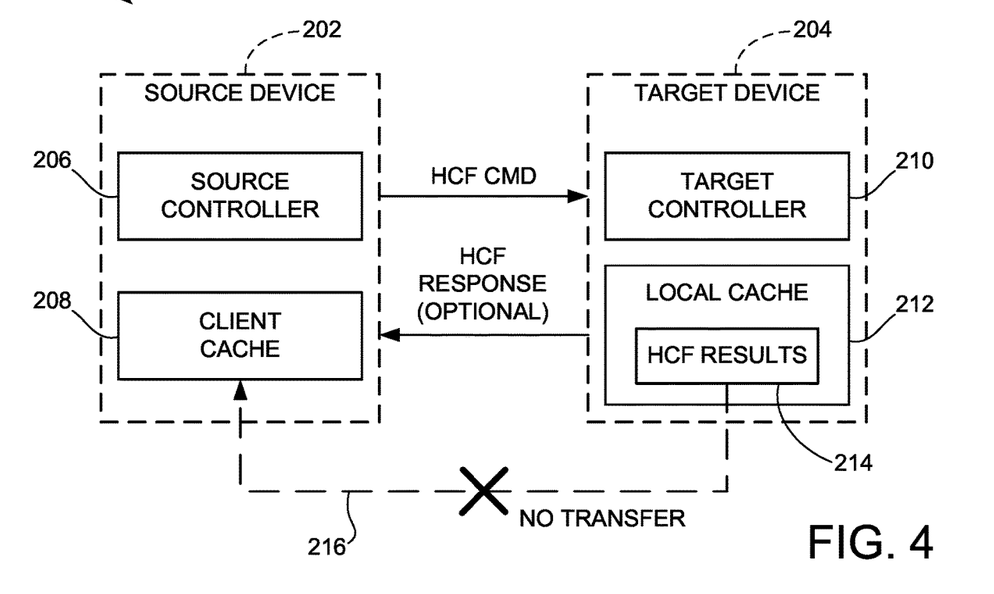
FIG. 4 shows yet another arrangement of a client (source) device and a target (storage) device in accordance with various embodiments.

FIG. 4 is a functional block representation of a portion of another computer network system 200 arranged to operate in accordance with some embodiments. The system 200 includes a source device 202 coupled to a target device 204. It is contemplated that the source device 202 corresponds to a client device such described above in FIGS. 1-3 and the target device 204 corresponds to a data storage device such as described above in FIGS. 1-3. Other configurations can be used including source devices that are not necessarily characterized as host devices and target devices that are not necessarily characterized as data storage devices.

The source device 202 includes a source controller 206 and a client cache 208. The target device 204 includes a target controller 210 and a local cache 212. The controllers 206, 208 may take the form of the various controllers discussed above including hardware and/or programmable processors. The caches 208, 212 may take the form of volatile or non-volatile memory including RAM, flash, FeRAM, STRAM, RRAM, phase change RAM, disc media cache, etc. An SOC (system on chip) approach can be used so that the respective caches are internal memory within a larger integrated circuit package that also incorporates the associated controller. Alternatively, the caches may be separate memory devices accessible by the respective controllers.

During operation of the system of FIG. 4, the source controller 206 issues a hidden compute function command (HCF CMD) to the target controller 208 in order to carry out a corresponding HCF locally at the target device level. As noted previously, it will be understood that the HCF can constitute substantially any number of different types of functions or operations as required.

The execution of the HCF may involve the execution of program instructions in a memory of or accessible by the target device, such as in the form of an application (app), a firmware (FW) routine, a script, a container, an object, etc. The program instructions may be transferred to the target device 204 as part of the command, the program instructions may be previously stored and resident in the local memory of the target device, the program instructions may be stored in a different device that is accessed responsive to the command, etc.

The execution of the HCF generates HCF results 214 in the form of accumulated output data in the local cache 212 during an execution time interval associated with the HCF. In one non-limiting example, the HCF command results in the updating of a ledger of a block chain data structure using existing data available to the local target device. As shown by dotted line 216, there is no transfer permitted of the HCF results to the client cache 208, although, as described more fully below, some sort of optional HCF response may be supplied back to the source device (e.g., command receipt acknowledgement, command complete indication, verification data, dummy data, etc.).

Figure 5:
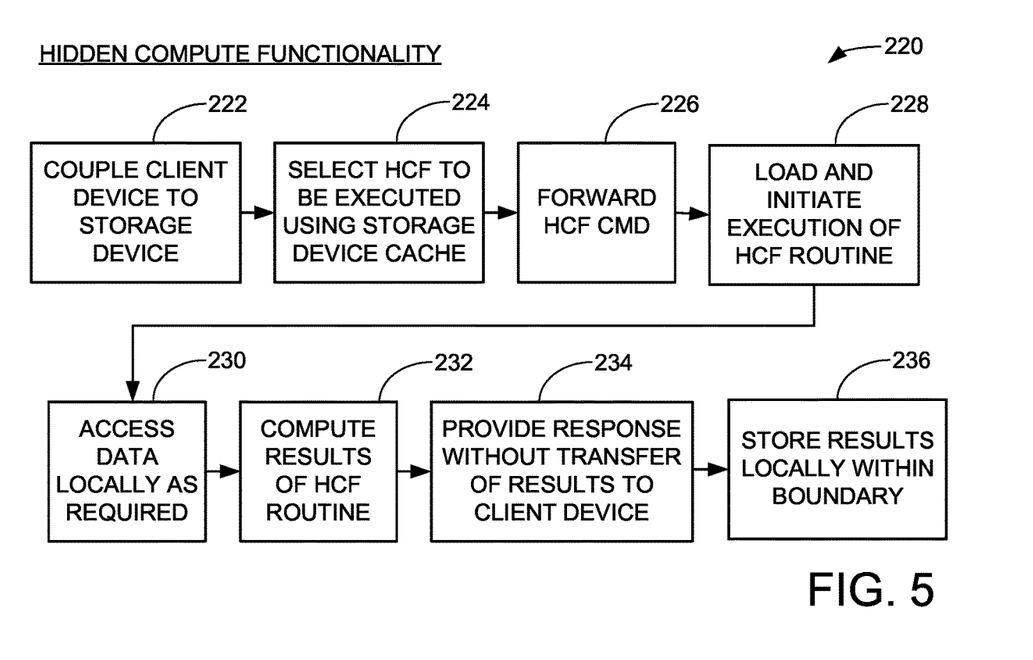
FIG. 5 is a flow diagram of functional steps that can be taken by the various systems of FIGS. 1-4 in some embodiments.

FIG. 5 provides a flow diagram 220 to describe the hidden compute functionality operation of the system 200 of FIG. 4 in the context of a client computer device and an associated data storage device. The respective devices are initially coupled at block 222, such as via a network interface connection. An HCF is selected by the controller of the client device at 224, and an associated command is forwarded (226) to commence execution of the selected HCF (228). As required, the local (storage device) cache is configured to receive local data during execution, block 230. This can include allocation of an appropriate amount of memory to be used during HCF execution, the loading of seed data to the local cache by the source controller, etc. Establishment of a suitable retention boundary (see 128, FIG. 3) is carried out at this time.

The HCF is completed at 232. Responses are supplied to the client device as required at 234 without the transfer of the HCF results outside the established boundary. Finally, the HCF results are stored locally within the boundary for future reference and use, such as in one or more local NVMs within the boundary, as indicated at 236.

Figure 6:
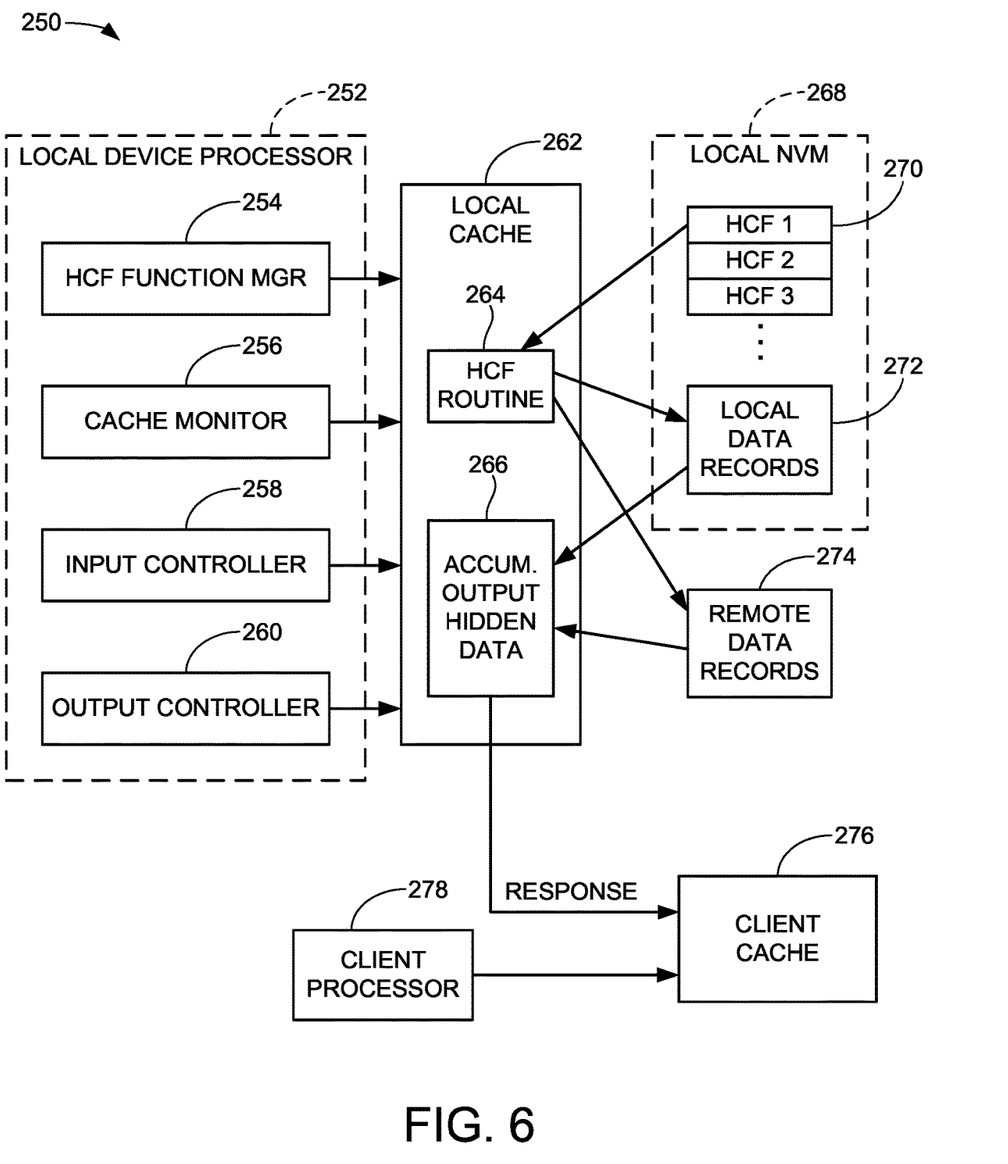
FIG. 6 shows aspects of a storage device configured to operate in accordance with some embodiments.

FIG. 6 shows another system 250 similar to the system 200 of FIG. 4 in accordance with some embodiments. A local device processor 252 incorporates various functional block circuits including an HCF function manager 254, a cache monitor 256, an input controller 258 and an output controller 260, all of which are operably coupled to a local cache 262.

The HCF function manager 252 controls the selection, loading and operation of the selected HCF being executed, which is denoted at 264. In this example, it is contemplated that the HCF routine (program instructions) 264 will be loaded to the local cache 262 for ready access by the associated processor, although such is not necessarily required; any suitable memory location can be used.

The cache monitor 256 monitors the accumulation of the output data, denoted at 266, during execution of the HCF routine. The input controller 258 generally controls inputs supplied to the cache 262, and the output controller 260 generally controls outputs from the cache 262.

A device NVM is denoted at 268, and this can be used to store and supply various HCF routines 270 for loading to the local cache 262, as well as storing and supplying user data such as local data records 272 that can be retrieved and acted upon to generate the accumulated output data 266. In some cases, external data such as in the form of remote data records 274 resident in an external location, such as a different data storage device or other external device, can additionally or alternatively be accessed and retrieved by the executed HCF. While not shown in FIG. 5, the HCF routine can likewise be supplied from an external device.

When utilized, the one or more responses generated during and after the execution of the HCF routine are forwarded to a client cache 276 similar to the cache 208 (FIG. 4) for access and use by a client processor 278.

Figure 7:
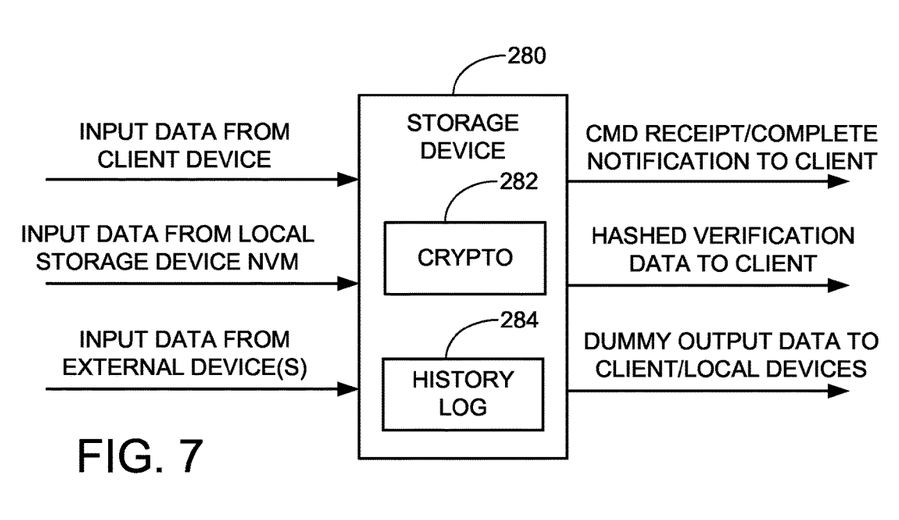
FIG. 7 shows input and output operations for another storage device in some embodiments.

FIG. 7 shows aspects of the operation of the system of FIG. 6 in further detail. A storage device 280 includes a crypto circuit 282 to carry out various cryptographic functions, and a history log 284 to capture, monitor and maintain history data records concerning the various HCF routines executed by the system. The routines can utilize a number of inputs including the loading of input data from the client device, input data from the local NVM, and input data from one or more external devices including data from other data storage devices, the initiating client device, etc.

The input data from the client device can include seed data to initiate the HCF processing. Input data can also be characterized as intermediate data obtained during the execution of the HCF. The input data from the local storage device NVM can be data records retrieved from the local NVM (e.g., memories 114, 268). The input data from external devices can include data from other external data storage devices associated with the storage device housing the storage device cache 262.

Output responses that can be generated and provided by the storage device 280 to the initiating client device, or other external device, can include command receipt notifications, command complete notifications, protected verification data, or dummy output data to provide a decoy operation to further mask the operation of the HCF. Other forms of data can be supplied.

Figure 8:
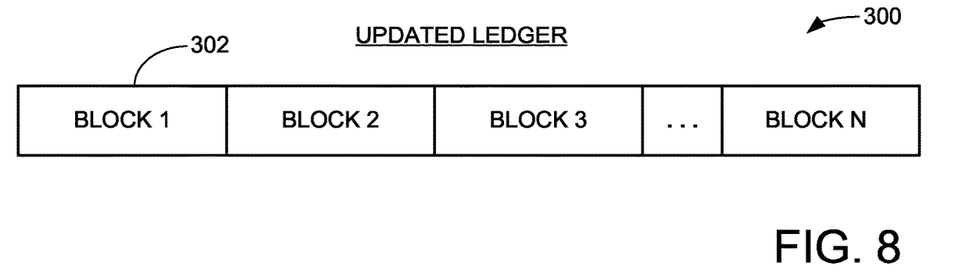
FIG. 8 is a graphical representation of accumulated output data in some embodiments.

FIG. 8 shows an updated ledger 300 that can be generated by a selected HCF routine. The ledger 300 includes a number of blocks 302 denoted as Blocks 1-N. As will be recognized, the latest block N can be cryptographically generated based on a combination of all of the previous blocks N-1 using known ledger and block-chain techniques. Other processing operations can be applied.

Cryptographic techniques are well known and so a detailed description is not necessary to understand aspects and operation of the various embodiments presented herein. Nonetheless, in at least some cases it may be advisable to subject the various data sets and responses to various cryptographic techniques by the crypto block 282. Examples include but are not limited to encryption (including public/private key encryption, symmetric encryption utilizing secret encryption keys, etc), digital signatures, HMACs (hash-based message authentication codes), block-chain ledger update algorithms, etc. These and other forms of cryptographic functions can be used to protect and authenticate the processed data during and after the execution of the SCF routine.

At this point it will be appreciated that substantially any form of function can be carried out as the HCF routine. The routine may involve the application of combinatorial logic to a set of input data to generate the output data. Illustrative examples apart from the updated block-chain ledger of FIG. 8 include but are not limited to a search of database records to calculate summary data, a review of graphical images during an image matching search, the generation of cryptocurrency values, statistical analyses on data, orbital mechanic calculations, and so on.

Figure 9:
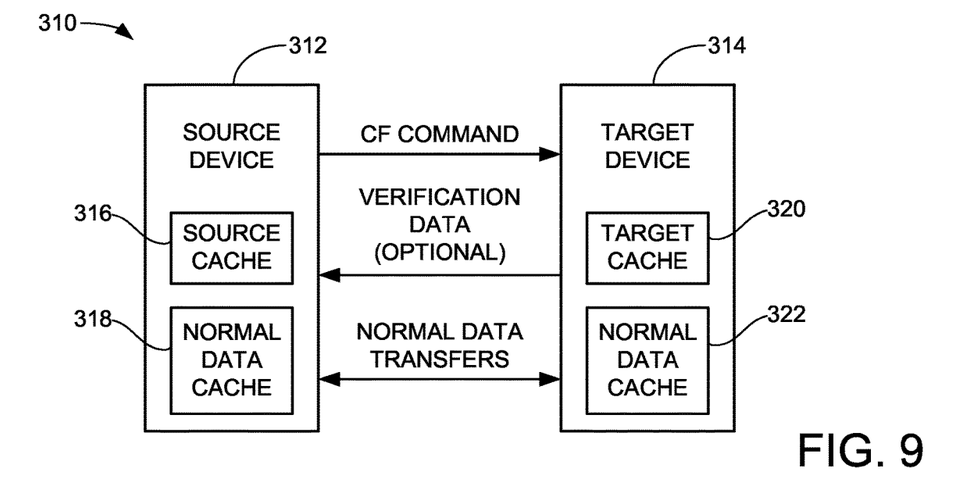
FIG. 9 shows another system incorporating respective source and target devices operative in accordance with further embodiments.

FIG. 9 shows aspects of another network 310 corresponding to those set forth above. A source device 312 communicates with a target device 314 over one or more suitable interfaces. The source device 312 includes a source cache 316 and a normal data cache 318. These may be the same memory device or separate memory devices. The target device 314 similarly has a target cache 316 and a normal data cache 322. As before, these may be the same memory device or separate memory devices.

FIG. 9 demonstrates that the normal data caches 318, 322 are used to process normal data transfers between the respective devices, whereas the source and target caches 316 and 320 are dedicated to processing the HCF routine. While the actual results from the HCF are not returned to the source cache, the source cache can be used to load and transfer input data as well as process other control data associated with the hidden function.

Figure 10:
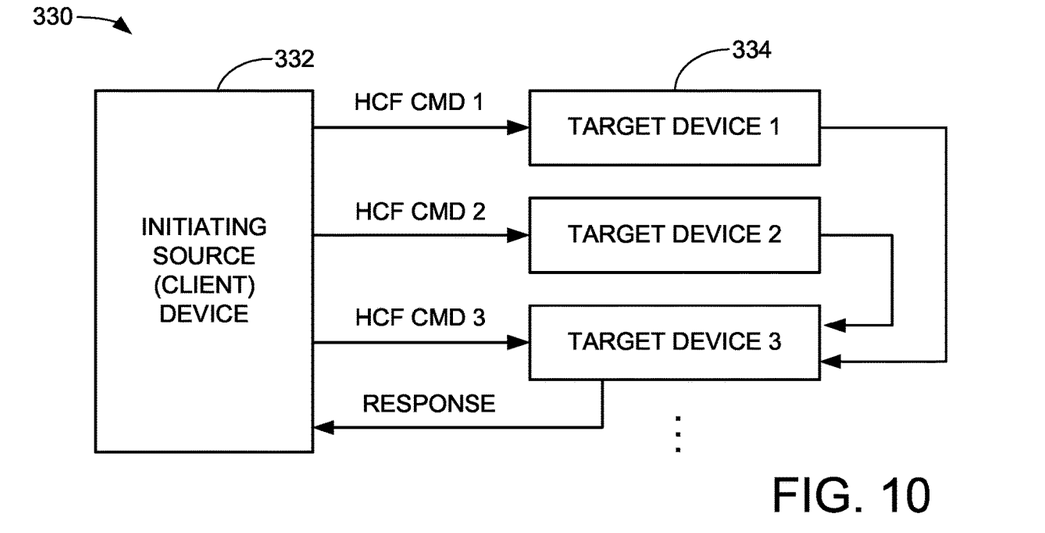
FIG. 10 shows processing of hidden compute functions among a number of storage devices in some embodiments.

FIG. 10 shows a chaining operation that can be carried out in accordance with some embodiments to execute hidden compute functionality. Separate HCF commands can be forwarded from an initiating source device 332 to various target devices 334. In some cases, commands, data sets and partial results of the HCF processing can be shared or passed on to different ones of the processing target devices, as shown. In some cases, a single command, such as HCF CMD 1, can be supplied to the first target device, and remaining processing can be carried out internally within the retention boundary. This can make it difficult for an attacking party to discover or determine what processing is taking place, where the data are stored, etc.

Figure 11:
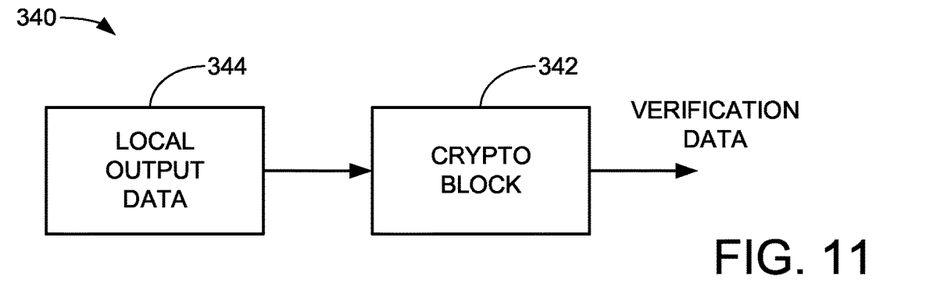
FIG. 11 depicts the generation of cryptographically protected verification data in some embodiments.

FIG. 11 shows another aspect of a system 340 with a crypto block 344 similar to that discussed above. Local output data constituting a portion of the HCF results, shown at block 344, may be supplied and processed by the crypto block 342 to generate verification data. It is contemplated that the actual results are not transferred; however, an HMAC value, or a portion of the results (e.g., the Mth block out of N total blocks, etc.) may be subjected to one-way processing by the crypto to provide verification data to the initiating device. Nevertheless, further processing desired by the client will need to take place at the storage device level within the retention boundary to retain the data within the boundary and keep the results off the intervening interface.

Figure 12:
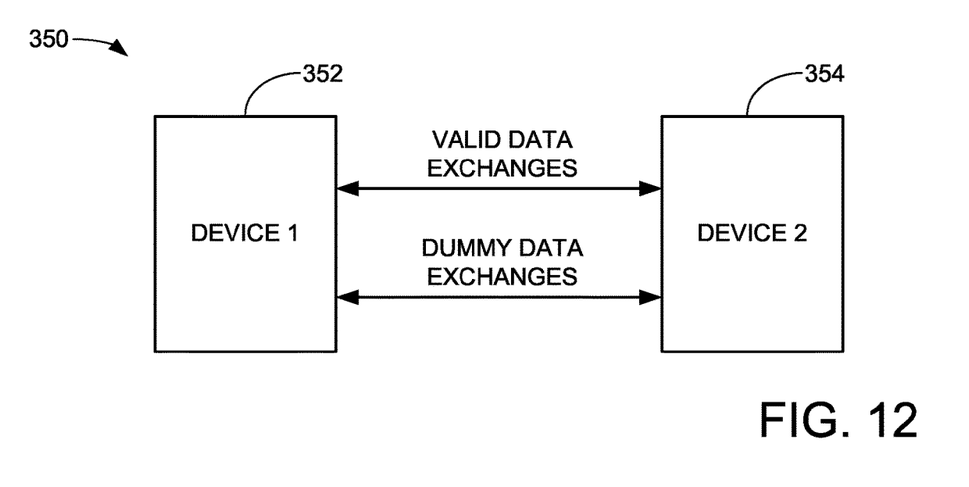
FIG. 12 depicts the generation and transfer of valid and dummy data exchanges in some embodiments.

System 350 in FIG. 12 depicts two communicating devices 352 and 354. These can be separate data storage devices, the data storage device in conjunction with the initiating client device, etc. FIG. 12 shows the exchange of different types of data between the respective devices that can be carried out at suitable times, including during the execution of the selected SCF routine. These data exchanges can include so-called valid data exchanges, such as the normal data transfers described above (either during the normal transfer operations or the hidden functionality processing).

These data exchanges can further be masked by so-called dummy data exchanges, which are meaningless data exchanges between the respective devices. The dummy data exchanges can be generated in any number of ways, including through the use of random reads, generation of random data, cryptographically processed patterns, etc. The general operation is that hidden within the valid exchanges may be one or multiple dummy data exchanges. In this way, an attacker may be challenged to sort through the dummy data exchanges in an effort to locate and decode the results of the HCF routine. Since the actual results are not forwarded, but decoy data sets are transferred instead, further security can be realized.

Figure 13:
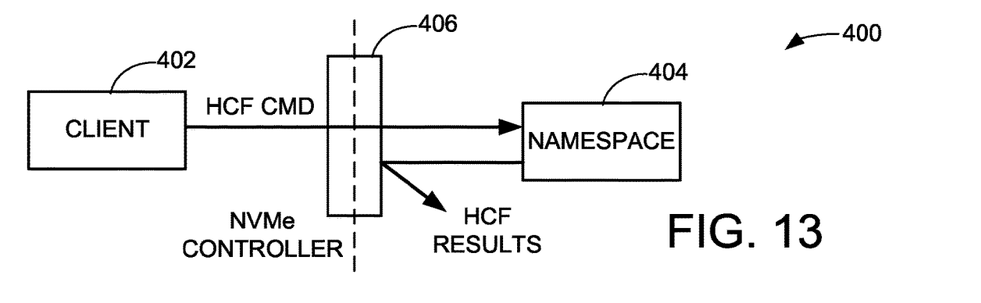
FIG. 13 shows yet another system operative in an NVMe environment in accordance with further embodiments.

FIG. 13 is yet another aspect of a computer network system 400 in further embodiments. The system is arranged to operate in accordance with the NVMe standard and includes a client 402 which communicates with an NVMe namespace 404 to process a hidden function as described above. The namespace 404 may be some or all of the NVM of one or more associated data storage devices which are accessed as an overall memory space. An intervening NVMe controller (block 406) establishes a boundary in this embodiment, so that the HCF results can be retained within the namespace but not forwarded outside the namespace constraints.

Figure 14:
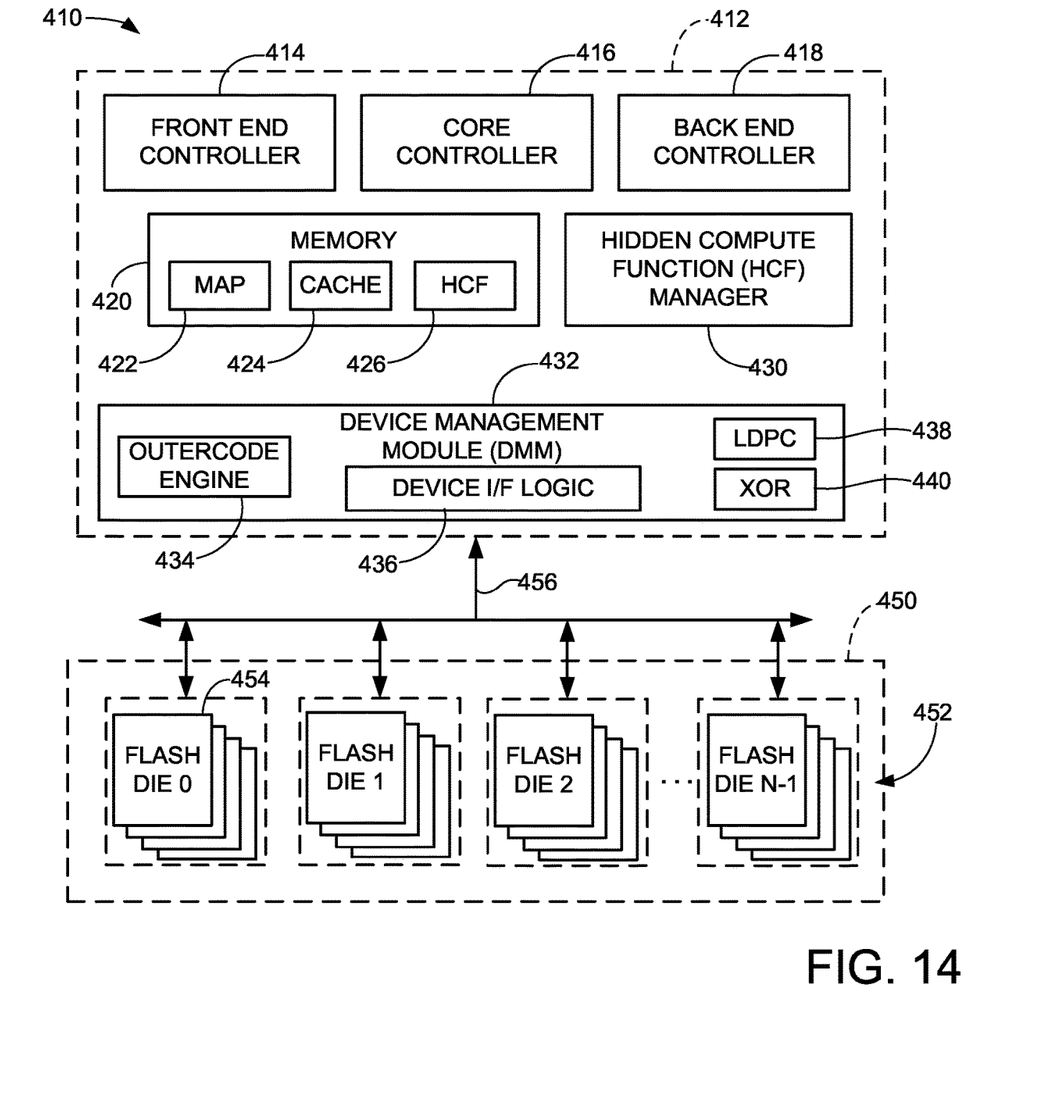
FIG. 14 is a functional block depiction of a storage device utilized in accordance with various embodiments configured as a solid-state drive (SSD).

The foregoing description of various embodiments can be carried out using any number of different types of processing devices. In some embodiments, data storage devices configured as solid-state drives (SSDs) are particularly suited to carry out the hidden functionality described herein. To this end, FIG. 14 is a functional block representation of an SSD 410 constructed and operated to be incorporated in any of the foregoing example embodiments as desired.

The SSD 410 includes a controller circuit 412 that generally corresponds to the controller 104 of FIG. 1. The controller circuit 412 includes a front end controller 414, a core controller 416 and a back end controller 418. The front end controller 416 performs client (host) I/F functions, the hack end controller 420 directs data transfers with the NVM (flash memory 450) and the core controller 416 provides top level control for the device 410.

Each controller 414, 416, 418 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. Multiple programmable processors can be used in each of these operative units. A pure hardware based controller configuration, or a hybrid hardware/programmable processor arrangement can alternatively be used. The various controllers may be integrated into a single system on chip (SOC) integrated circuit device, or may be distributed among various discrete devices as required.

A controller memory 420 represents various forms of volatile and/or non-volatile memory (e.g., SRAM, DDR DRAM, flash, etc.) utilized as local memory by the controller 412. Various data structures and data sets may be stored by the memory including one or more metadata map structures 422, one or more sets of cached data 424, and one or more sets of HCF data 426. Other types of data sets can be stored in the memory 420 as well.

A hidden compute function (HCF) manager circuit 430 is provided as described above to manage various HCFs carried out by the SSD 410. The circuit 430 can be a standalone circuit or can be incorporated into one or more of the programmable processors of the various controllers 414, 416, 418.

A device management module (DMM) 432 supports back end processing operations. The DMM 432 includes an outer code engine circuit 434 to generate outer code, a device OF logic circuit 436 to provide data communications, and a low density parity check (LDPC) circuit 438 configured to generate LDPC codes as part of an error detection and correction strategy used to protect the data stored by the by SSD 410. One or more XOR buffers 440 are additionally incorporated to temporarily store and accumulate parity data during data transfer operations.

The memory module 114 of FIG. 1 is realized as the aforementioned flash memory 450 which includes an NVM in the form of a flash memory 442 distributed across a plural number N of flash memory dies 444. Rudimentary flash memory control electronics may be provisioned on each die 444 or for groups of dies to facilitate parallel data transfer operations via a number of channels (lanes) 446.

It can be seen that the hidden functionality described herein can be allocated for execution by one or more SSDs such as 410, and the output HCF results can be efficiently stored in the flash memory for local access as required.

It is contemplated that the hidden functionality will operate such that the HCF results (also sometimes referred to as the HCF output data) remain permanently within the retention boundary. Steps can be taken to physically destroy the HCF output data should physical movement of the storage device be detected, unauthorized actions are taken to access the data, etc. Nevertheless, the system can be configured to permit access to the HCF output data under some controlled circumstances, such as through activation of a physical switch or other action that can only be taken by an authorized user at the location of the device, etc.

Various embodiments of the present disclosure can now be understood as providing a number of benefits over the prior art, including the ability to perform hidden compute functions in a distributed computing environment in a secure and efficient manner.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   establishing a trust boundary that includes a source device and a target device in a distributed processing network;

transferring, from the source device to the target device across an interface, a hidden compute function (HCF) command to initiate execution of an associated HCF routine by the target device;

using a local cache of the target device to accumulate HCF output data responsive to the execution of the associated HCF routine;

establishing a retention boundary subsumed within the trust boundary that includes the source device and excludes the target device; and permanently retaining the HCF output data wholly within the retention boundary so that the HCF output data is neither transferred to the source device nor placed on the interface outside the retention boundary.

2. The method of claim 1, wherein the source device is a client device having a client controller and the target device is a data storage device having a storage device controller and a storage device memory, and the HCF output data are generated by applying at least one combinatorial function to an initial data set stored in the storage device memory.

3. The method of claim 1, wherein the retention boundary encompasses a plurality of additional target devices nominally identical in construction to the target device, and wherein the execution of the HCF routine comprises individual data transfers to the target device from the additional target devices within the retention boundary.

4. The method of claim 1, wherein the retention boundary corresponds to physical memory distributed across multiple data storage devices assigned to a selected Non-Volatile Memory Express (NVMe) namespace, so that the HCF output data are permanently retained within the NVMe namespace and are not transferred therebeyond.

5. The method of claim 1, further comprising providing a response from the source device to the target device, the response characterized as at least one of the following: a command receipt acknowledgement, a command complete acknowledgement, a cryptographically generated value that does not include any portion of the HCF output data, or decoy data not associated with the HCF output data and designed to mimic the HCF output data.

6. The method of claim 1, further comprising forwarding a normal data transfer command from the source device to the target device via the interface, and processing the normal data transfer command by the target device to write data to or read data from a non-volatile memory (NVM) of the target device.

7. The method of claim 1, wherein the target device is a first data storage device, wherein the first data storage device communicates with a second data storage device within the retention boundary to generate the HCF output data, and wherein the second data storage device provides a response to the source device that does not include any portion of the HCF output data.

8. The method of claim 1, wherein the target device is a solid-state drive (SSD).

9. The method of claim 1, wherein the HCF routine is stored in a local memory of the target device.

10. The method of claim 1, wherein the HCF routine is transferred to the target device by the source device in conjunction with the HCF command.

11. The method of claim 1, wherein the HCF routine generates an updated block of a block-chain ledger.

12. The method of claim 1, wherein the source device comprises a client device that communicates with the target device over the Internet, the target device comprises a storage array comprising a plurality of data storage devices and a storage controller, and wherein the retention boundary is physically encompassed within and does not extend beyond the storage array.

13. A storage device configured to be coupled to a client device via a data interface, the storage device comprising:

a local cache;

a main memory store comprising non-volatile memory (NVM); and a storage device processor configured to establish a trust boundary that includes the storage device and the client device, to execute a hidden command function (HCF) to accumulate HCF output data in the local cache responsive to an HCF command received from the client device over the data interface, to establish a smaller retention boundary within the trust boundary that includes the storage device and excludes the client device, and to store the HCF output data in the NVM while not transferring any portion of the HCF output data outside the retention boundary.

14. The storage device of claim 13, wherein the storage device processor configures and maintains the retention boundary to encompass at least one additional data storage device but not the client device or any other client device coupled to the data interface.

15. The storage device of claim 13, wherein the storage device processor retrieves an existing data set from the NVM to generate the HCF output data.

16. The storage device of claim 13, characterized as a storage array comprising a plurality of nominally identical data storage devices.

17. The storage device of claim 13, wherein the storage device is configured to communicate with the client device over the data interface in accordance with the Compute Express Link (CXL) specification.

18. The storage device of claim 13, wherein the storage device processor is further configured to perform a secure erase of the HCF output data responsive to a detected physical movement of the storage device by an unauthorized user outside the retention boundary.

19. The storage device of claim 13, wherein the retention boundary is defined as a Non-Volatile Memory Express (NVMe) namespace of which the NVM forms a part so that the HCF output data are not transferred beyond an NVMe controller of the NVMe namespace.

20. The storage device of claim 13, wherein the storage device processor is further configured to provide a response to the client device comprising at least one of the following: a command receipt acknowledgement, a command complete acknowledgement, a cryptographically generated value that does not include any portion of the HCF output data, or decoy data not associated with the HCF output data and designed to mimic the HCF output data.

* * * * *